(12) United States Patent
Honorato Ruiz et al.

(10) Patent No.: US 10,830,376 B2
(45) Date of Patent: Nov. 10, 2020

(54) COMPOSITE STRUCTURE HAVING AN INTEGRATED SUPPORT

(71) Applicant: AIRBUS OPERATIONS S.L., Madrid (ES)

(72) Inventors: Francisco Javier Honorato Ruiz, Madrid (ES); Diego Sanchez Franco, Madrid (ES); Luis Rodriguez Urbina, Madrid (ES); Enrique Guinaldo Fernandez, Madrid (ES); Carlos Garcia Nieto, Madrid (ES)

(73) Assignee: Airbus Operations S.L., Madrid (ES)

( * ) Notice: Subject to any disclaimer, the term of this patent is extended or adjusted under 35 U.S.C. 154(b) by 38 days.

(21) Appl. No.: 16/190,732

(22) Filed: Nov. 14, 2018

(65) Prior Publication Data

US 2019/0145550 A1 May 16, 2019

(30) Foreign Application Priority Data

Nov. 15, 2017 (EP) .................................... 17382773

(51) Int. Cl.
*F16L 3/08* (2006.01)
*F16L 3/123* (2006.01)
(Continued)

(52) U.S. Cl.
CPC .......... *F16L 3/123* (2013.01); *B29C 65/5014* (2013.01); *B29C 65/5042* (2013.01);
(Continued)

(58) Field of Classification Search
CPC .. F16L 3/123; B29C 65/5014; B29C 65/5042; B32B 7/05; B64C 1/065; B64C 1/26
(Continued)

(56) References Cited

U.S. PATENT DOCUMENTS

2012/0193473 A1* 8/2012 Casado Abarquero ... B64C 3/26
244/123.8
2013/0101801 A1* 4/2013 Honorato Ruiz ....... B64C 1/064
428/167
(Continued)

FOREIGN PATENT DOCUMENTS

EP         2 336 021              6/2011
EP         2336021 A2 *           6/2011   ............. B29C 70/00

OTHER PUBLICATIONS

Extended Search Report for EP17382773.4, dated May 30, 2018, 8 pages.

*Primary Examiner* — Todd M Epps
(74) *Attorney, Agent, or Firm* — Nixon & Vanderhye P.C.

(57) ABSTRACT

A composite structure (1) for an aircraft, having at least one insert (2) for receiving attachment devices, each insert (2) includes a core (3) having a major dimension and containing at least one through-hole (4), and a composite strip arrangement formed by a first section (5) surrounding the core (3) and attached to said core (3) by an adhesive polymeric layer, and a second section (6) including at least one free end (6a). The first (5) and the second portion (6) of the composite strip arrangement are disposed over a first surface (1a) of the composite structure (1), such that the major dimension of the core (3) is positioned transversal to said first surface (1 a). The at least one insert (2) is co-cured with the composite structure (1).

15 Claims, 5 Drawing Sheets

(51) Int. Cl.
*H02G 3/00* (2006.01)
*F16B 5/06* (2006.01)
*B29C 65/50* (2006.01)
*B29C 70/74* (2006.01)
*B29C 65/00* (2006.01)
*B29C 65/56* (2006.01)
*F16B 9/02* (2006.01)
*F16B 7/04* (2006.01)
*B29L 31/00* (2006.01)
*B29L 31/30* (2006.01)
*F16B 2/10* (2006.01)

(52) U.S. Cl.
CPC .......... *B29C 65/561* (2013.01); *B29C 65/562* (2013.01); *B29C 66/112* (2013.01); *B29C 66/114* (2013.01); *B29C 66/474* (2013.01); *B29C 66/532* (2013.01); *B29C 66/721* (2013.01); *B29C 66/73751* (2013.01); *B29C 70/74* (2013.01); *F16B 5/0685* (2013.01); *H02G 3/26* (2013.01); *B29C 66/727* (2013.01); *B29C 66/72143* (2013.01); *B29C 66/7392* (2013.01); *B29L 2031/3076* (2013.01); *B29L 2031/737* (2013.01); *F16B 2/10* (2013.01); *F16B 7/0433* (2013.01); *F16B 9/02* (2013.01)

(58) Field of Classification Search
USPC .................................................. 248/74.3, 74.1
See application file for complete search history.

(56) References Cited

U.S. PATENT DOCUMENTS

2017/0334545 A1* 11/2017 Guinaldo Fernandez .................. B64C 5/02
2019/0016437 A1* 1/2019 Arana Hidalgo .... H02G 3/0406

* cited by examiner

COMPOSITE STRUCTURE HAVING AN INTEGRATED SUPPORT

RELATED APPLICATION

This application claims priority to European Patent Application 17382773-4, filed 15 Nov. 2017, the entirety of which is incorporated by reference.

FIELD

The present invention relates to a configuration and a manufacturing method of a composite structure for an aircraft having an integrated insert for receiving attachment devices. The invention further refers to an attachable system that includes the composite structure with the integrated insert, and an attachment device to attach external routings (ducts of the hydraulic system and wirings of the electric system) to the insert.

BACKGROUND

In addition to structures which support aerodynamic loads (statically and cycling), aircraft require complex systems, which are defined in the design stage and in the operating process, to ensure continued airworthiness of aircraft. Some of these systems are essential for keeping the aircraft flying, such as flight controls. These essential systems are required by airworthiness regulations to have duplicate (redundant) systems that are segregated to minimize the consequences of any one system having an incorrect function.

The overall manufacturing of each system, including system devices and routing, of the aircraft, together with its respective installation in the aircraft is difficult. Because of these difficulties, these systems typically require a long and complex development process which involves high costs and significant lead time in the overall aircraft development and production.

Also, once the aircraft enters into service, several frequent maintenance tasks are mandatory over most of these systems and sub-systems to secure their well-performance due to their importance. These scheduled maintenance tasks, together with any additional ones coming from any function issue detected along them, have a relevant cost for the airliner and may have an impact on the aircraft departure.

As consequence, any improvement which could be implemented in terms of systems element reduction or simplification will have an important benefit not only for the aircraft manufacturers, but also for the airliners which are responsible for the in-service life of the airplane.

Both the hydraulic and the electric systems are critical in commercial aircrafts. On the one hand, the hydraulic system aims to provide power to actuate important devices in aircraft operation, such as spoilers, control surfaces, high lift devices, landing gear, engine reverses, brakes, and nose wheel steering. To provide enhanced safety, redundant components are provided for the hydraulic systems and these components are segregated and separated by a considerable distance in the aircraft. Electric systems traditionally provide power to the engine starter, avionics of the aircraft (e.g. Flight Control System (FCS)), and lightning systems including cockpit lightning, warning lights and cabin emergency lightning.

In commercial aircrafts, the routing of hydraulic and electrical systems commonly requires hundreds of meters of rigid pipes, flexible hoses, and wiring. The pipes may carry a compressed fluid. The wiring carry electricity all over the aircraft. To route and secure the hundreds of meters of pipes and wires requires thousands of fittings. The time and costs needed to install thousands of fittings are considerable and expensive.

SUMMARY

There is a long felt need to simplify the hydraulic and electric systems' routings, while reducing the installation and maintenance tasks associated with these systems.

The present invention may be embodied to overcome the above mentioned drawbacks by providing a composite structure having an integrated insert for receiving attachment devices, which simplifies the hydraulic and electric systems' routings, and results in significant savings in the installation and maintenance tasks of the aircraft.

The invention may be embodied as a composite structure for an aircraft that includes an insert for receiving attachment devices, and which can be manufactured as a single-piece component with one curing cycle, which is useful to reduce manufacturing time and production costs.

The invention may also be embodied as composite structure for an aircraft that facilitates the installation of supports (inserts), especially in areas of the aircraft with limited access. This reduces the time needed for maintenance tasks on the aircraft.

Further, the invention may be embodied as a composite structure having a weight reduced from that of traditional structures equipped with external supports. The composite structure may serve as a structural component withstanding high loads.

Further, the invention may be embodied as a method for manufacturing a composite structure with an integrated insert for receiving attachment devices, which is capable of offering a fast and cost-effective composite structure in respect with the time traditionally required for the manufacturing and the supports installation.

The composite structure may have at least one insert for receiving attachment devices. Each insert comprises a core having a major dimension and having at least one through-hole, and a composite strip arrangement formed by a first section, surrounding the core and attached to the core by an adhesive polymeric layer, and a second section, attached to the first section and comprising at least one free end for attachment to the composite structure.

At least one part of both the first and the second portion of the composite strip arrangement is disposed over a first surface of the composite structure, such that the major dimension of the core is positioned substantially transversal to the first surface of the composite structure. This positioning of the core helps to support the hydraulic and electric systems' routings, and eases their attachment to the core. Further, this positioning provides the clearance requested between the routing and the composite structure.

The insert is co-cured with the composite structure to thus obtain a composite structure with an integrated insert for the reception of attachment devices.

The new composite structure may be equipped with at least one insert that may be used as a support for receiving attachment devices intended to attach external routing (pipes, hoses, wirings, etc.) to the composite structure.

With the insert, the overall use of brackets and other supports for the attachment of external routing are reduced. This reduction of brackets involves a recurrent cost reduction, not only by the part manufacturing reduction, but also by the labor hours required for their installation in the aircraft.

Further, the composite structure avoids the need of installing supports in the structure before the final structural parts are integrated. This way, the invention facilitates the installation, specially, in areas where the access is limited, or there is no accessibility at all from either side of the structure.

Also, the invention may eliminate, or at least reduce, the need to form holes in primary or secondary composite structures for the attachment of external routing. Forming holes increases the local stress in the proximal area of the hole. Avoiding the formation of holes decreases local stress and allows for smaller thicknesses in the laminates, with an associated weight reduction.

In addition, the integration of the insert in the composite structure provides the potentiality of withstanding higher loads (weight of the routing, inertia loads, and vibration loads such as wind milling and SEI (Sustained Engine Imbalance)) with less weight than current composite structure designs.

An inventive attachable system for an aircraft is disclosed having a composite structure, as above described, and an attachment device. The attachment device includes a clamp configured to attach external routing and fixed to the insert via the at least one through-hole of the core.

The invention may also provides a complete system capable of both supporting the external routing and attaching it to the composite structure.

An inventive method is disclosed for manufacturing a composite structure having at least one insert for receiving attachment devices. The method comprises includes:

(i) providing at least one insert comprising a core having a major dimension and containing at least one through-hole, and a composite strip arrangement formed by a first section surrounding the core and attached to said core by an adhesive polymeric layer, and a second section comprising at least one free end, (ii) placing at least one part of both the first and the second portion of the composite strip arrangement over a first surface of the composite structure, such that the major dimension of the core is positioned substantially transversal to said first surface of the composite structure, and (iii) curing the at least one insert and the composite structure together to obtain a single piece, composite structure with an integrated insert for receiving attachment devices.

The method may provide high rate productions, due to the reduction of the labor hours required for electric and hydraulic systems installation, and the related lead time reduction.

The method provides a simplified structure design that reduces maintenance tasks and maintenance downtime, and which also offers the opportunity to standardize the brackets used for composite structures under different geometries and sizes. This also involves a non-recurring cost reduction thanks to the reduced number of assembly jigs required.

A inventive method is disclosed to manufacture a composite structure comprising: (i) forming providing an insert by applying an adhesive layer on a first composite strip to an outer edge of a core plate having a through hole, wherein a long edge of the core plate is not covered by the first composite strip; (ii) applying the long edge of the core plate to a first side of a second composite strip and applying a portion of the first composite strip to a portion of the second composite strip beyond the core plate, wherein the first and second composite strips entirely cover peripheral edges of the core plate; (iii) attaching a second side of the second composite strip to a first surface of the composite structure, such that the second composite strip is sandwiched between the first surface and the long edge of the core plate and portions of the second side of the second composite strip beyond the core plate extend are attached to the first surface; and (iv) curing the insert and the composite structure together such that the insert with the core plate and first and second composite strips and the composite structure form a single piece composite structure.

These methods may reduce the time needed for repair operations do to the simple attachment of the routings to the structure, minimizing the time required to disassemble and assemble the structure.

SUMMARY OF DRAWINGS

For a better comprehension of the invention, the following drawings are provided for illustrative and non-limiting purposes, wherein:

FIG. 6A shows a perspective view and FIG. 6B shows a cross-sectional and perspective view.

FIG. 7A shows a perspective view of an insert with several through-holes, and FIG. 7B shows a perspective view of external routing attached to the insert shown in FIG. 7A.

DETAILED DESCRIPTION

Figures 1A, 1B:
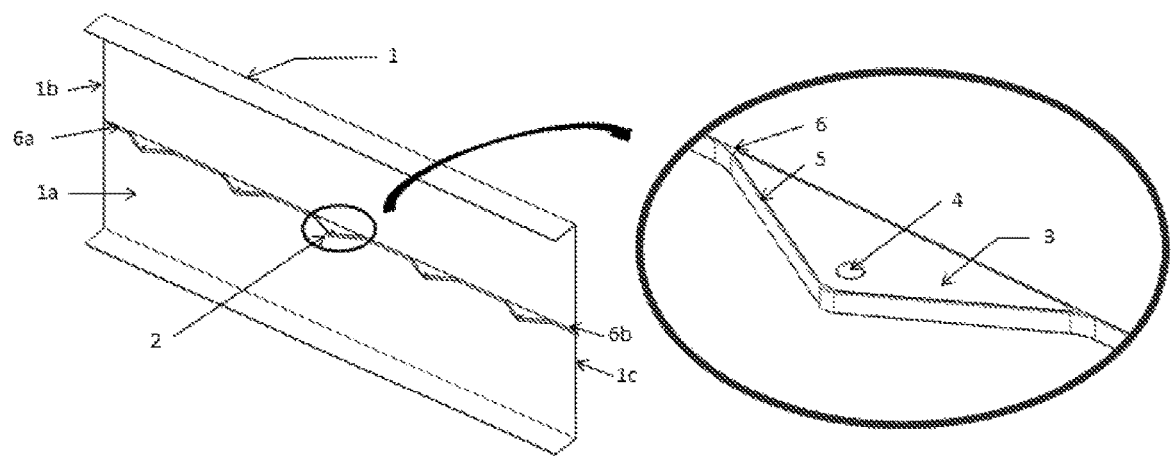
FIGS. 1A and 1B show a schematic perspective view of a composite structure having an insert for receiving attachment devices.

FIG. 1 shows a composite structure 1 for an aircraft according to a preferred embodiment. The composite structure 1 has at least one insert 2 for receiving attachment devices, wherein the at least one insert 2 comprises a core 3 and a composite strip arrangement.

As shown in the detailed view of FIG. 1, the composite structure 1 comprises several inserts 2 in where each core 3 contains at least one through-hole 4 intended to receive attachment devices for attaching external routing 10 to the structure 1.

Each core 3 has a major dimension for being positioned substantially transversal with respect to a first surface 1a of the composite structure 1. The core 3 may be a composite plate having a thickness substantially smaller than the length and width of the core. If the core is triangular in shape, the major dimension is the length of the base of the triangle. The major dimension of the core 3 may be the length of the longest edge of the core. Positioning the major dimension of the core 3 against the surface 1a of the structure provides good support to the core by the structure 1. This good support will help support the hydraulic and electric systems' routings which will be attached to the core 3.

As also shown in FIG. 1, the composite strip arrangement is formed by several first sections 5 and one second section 6 attached to the first sections 5. Every first section 5 is disposed around every core 3 and attached to it by an adhesive polymeric layer, while the second section 6 comprises two free ends 6a, 6b extended between the two opposite edges 1b, 1c of the composite structure 1 for its attaching to the structure 1.

Inserts 2 (core 3 and composite strip arrangement) are co-cured with the composite structure 1 to thus obtain a composite structure 1 with integrated inserts 2 for the reception of attachment devices.

According to an embodiment, the core 3 is formed by foam polymer, or short-fiber thermoplastic polymer, such as polyetherimide ULTEM™, or fiberglass.

The core 3 may have a polygonal shape, such as a triangular shape. The triangular shape offers an easily distinguished major dimension for its positioning in the structure 1, and provides sufficient support for the attachment devices and more free space for the installation tasks.

The at least one through-hole 4 of the core 3 may be positioned in the outermost section of the core 3 to provide greater clearance and easier installation of the attachment devices.

The insert 2 may include a metal bush in the at least one through-hole 4 of the core 3, wherein the metal bush is formed by aluminum alloy, or titanium, or steel alloy.

FIGS. 2 to 5, 6A, 6B, 7A and 7B show attachable systems for an aircraft, where each system includes a composite structure 1 having an insert 2 as above described, and an attachment device comprising a clamp 7 attaching the external routing 10, and fixed to the insert 2 via the at least one through-hole 4 of the core 3.

Figure 2:
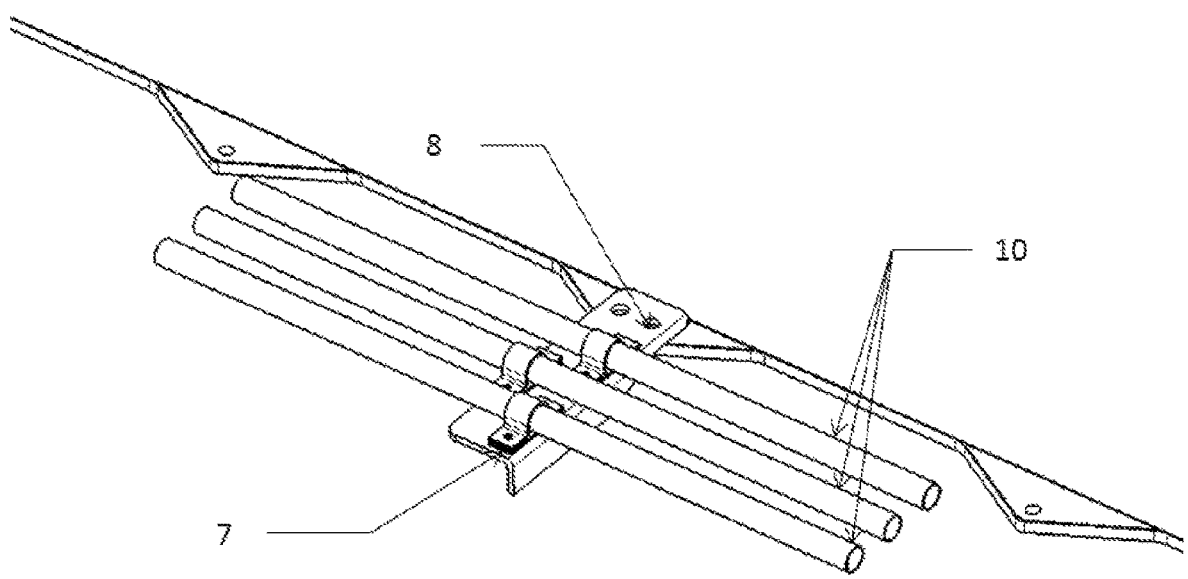
FIG. 2 shows a detailed view of an attachable system formed by a composite structure having an insert, and an attachment device.

As shown in FIG. 2, the attachment device may further comprise a bracket 8 configured to support the clamp 7, and being partially disposed onto the insert 2 and fixed to said insert 2 by the at least one through-hole 4 of the core 3. The bracket 8 and the clamp 7 may be form as a single body.

Figure 3:
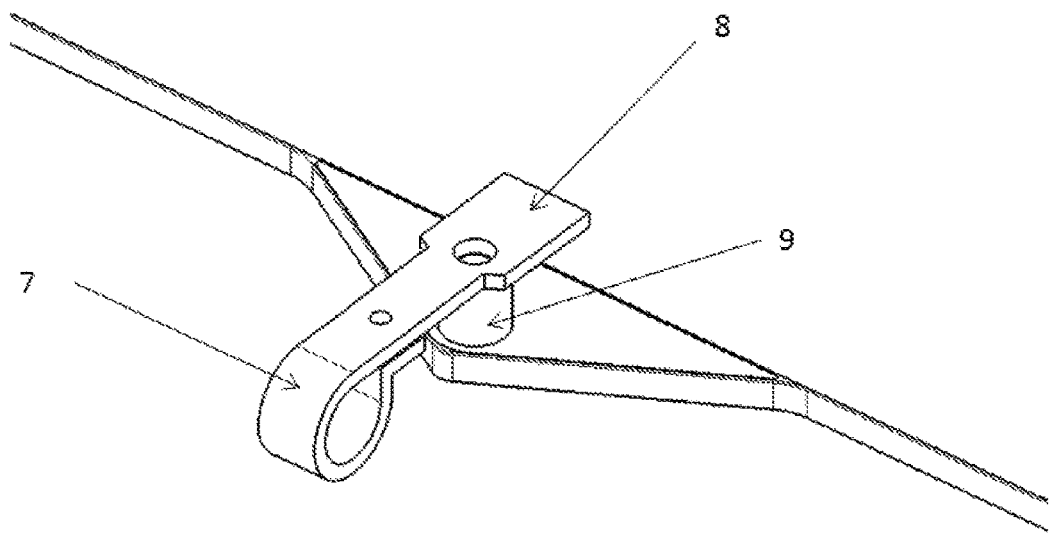
FIG. 3 shows a detailed view of an attachable system comprising another attachment device.

FIG. 3 shows a detailed view of an attachable system having an attachment device formed by a spacer 9, and a P clamp 7 formed together with a bracket 8 in a single body. The spacer 9 is configured as a tubular body, and disposed between the clamp 7 and the at least one through-hole 4 of the core 3, to provide clearance between the attachment device and the insert 2. The bracket 8 provides support for both the clamp 7 and the external routing 10, facilitating thus the installation of the external routing 10.

Figure 4:
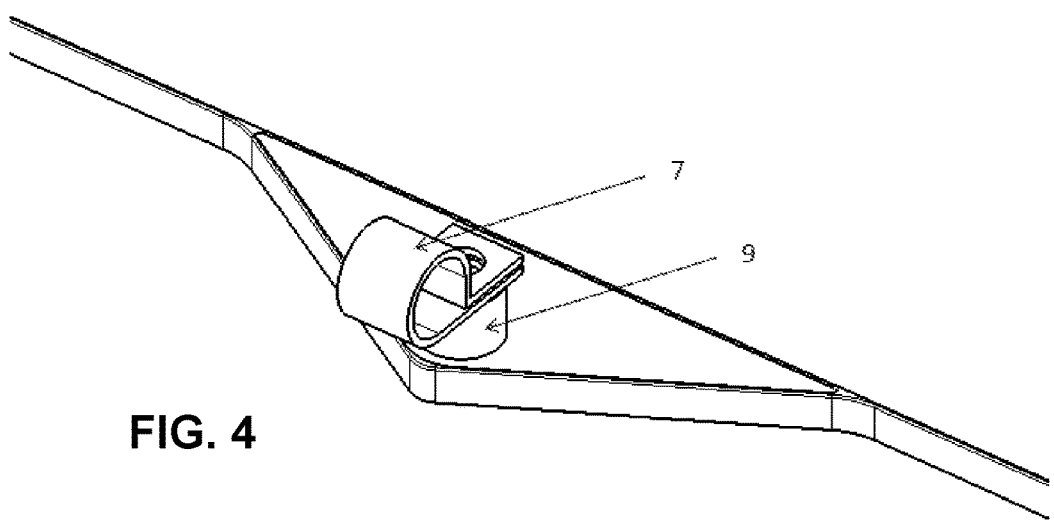
FIG. 4 shows a detailed view of an attachable system comprising a further attachment device.

FIG. 4 shows a detailed view of an attachable system with a simplified attachment device that comprises a spacer 9 and a P clamp 7. This device may be used when only one pipe (hose or wire) has to be attached, and there is no need for providing clearance between the pipe (hose or wire) and the composite structure 1.

Figure 5:
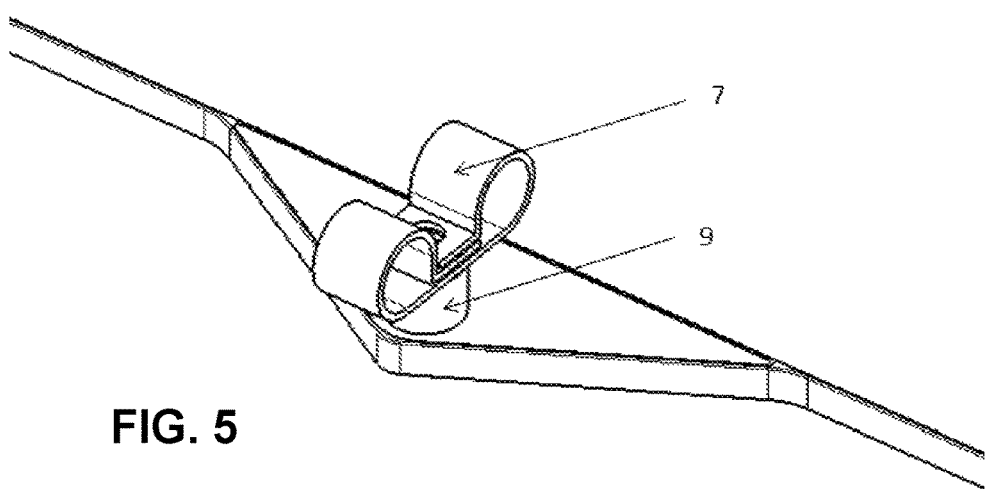
FIG. 5 shows a detailed view of an attachable system comprising another attachment device.

FIG. 5 shows a detailed view of an attachable system with another simplified attachment device that comprises a spacer 9 and a double P clamp 7. This device may be used when two pipes (hoses or wires) have to be attached, and there is no need for providing clearance between the pipes (hoses or wires) and the composite structure 1.

Figure 6A:
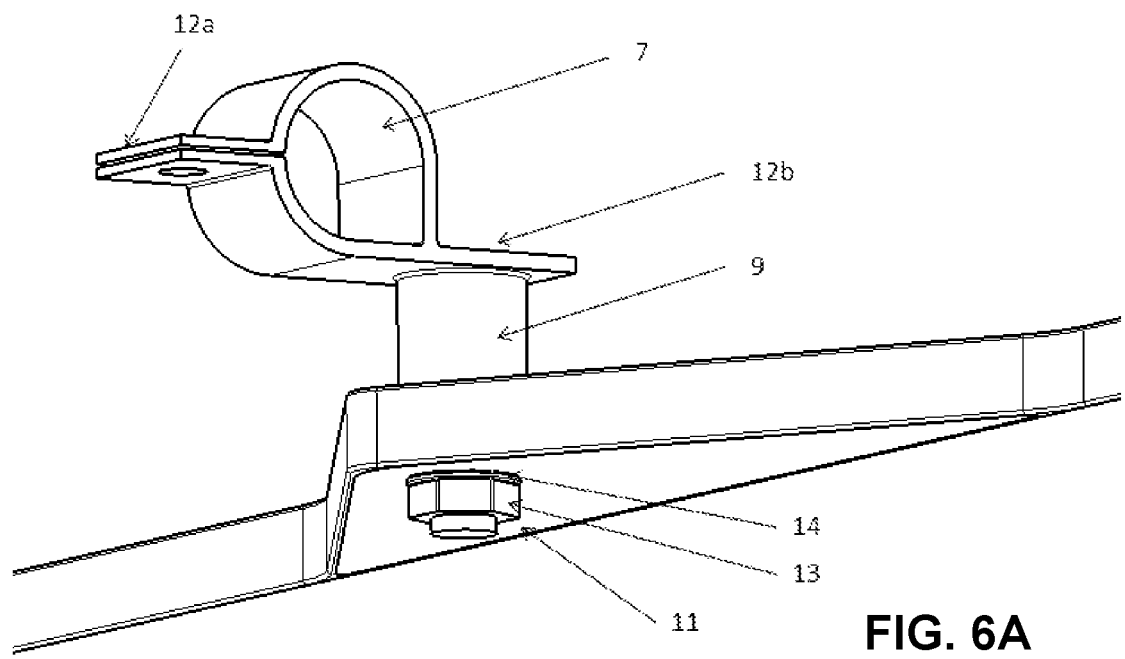
FIGS. 6A and 6B show a detailed view of an attachable system comprising a further attachment device.
Figure 6B:
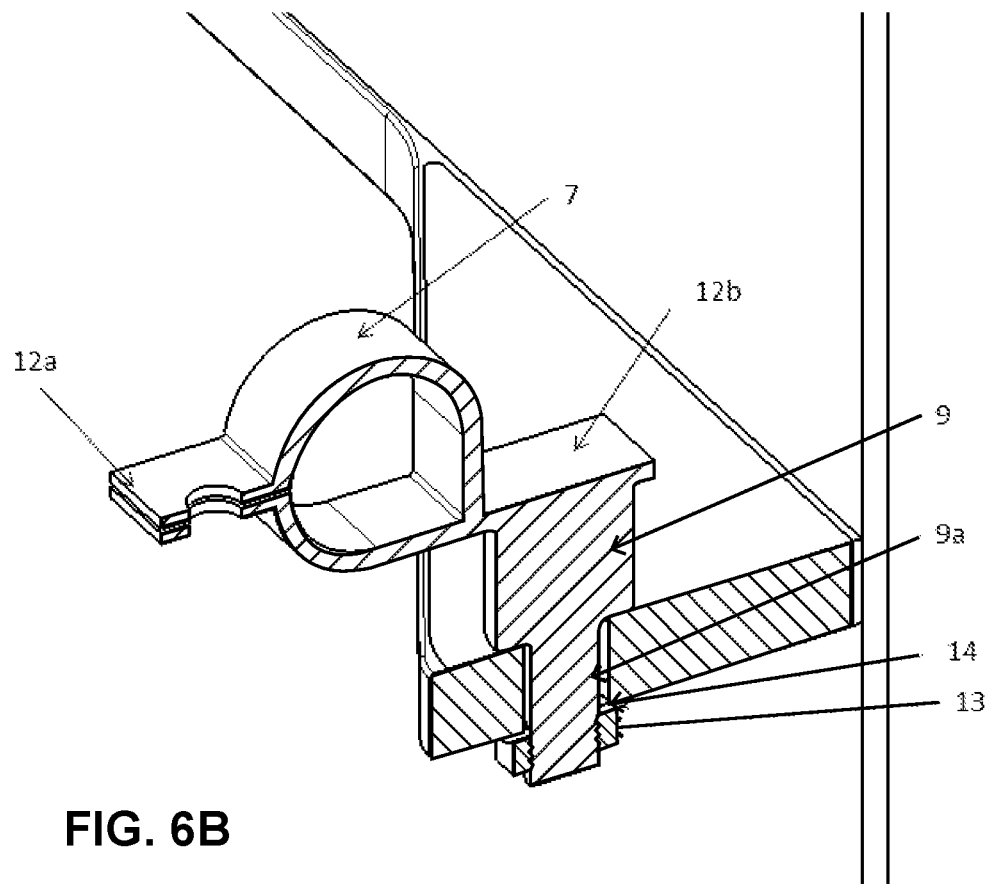

FIGS. 6A and 6B show a perspective and a cross-sectional detailed view of an attachment device comprising a clamp 7 having an annular body and two opposing projections 12a, 12b. One of the projections 12a being perforated to receive a fastener for retaining the external routing 10 inside the clamp 7, and the other projection 12b being terminated with a spacer 9 configured as a tubular body to provide clearance with the insert 2. The spacer 9 has a threaded end 9a to fix the clamp 7 to the insert 2 via the at least one through-hole 4 of the core 3.

The attachment device further comprises a fastener 11 attaching the clamp 7 to the insert 2 via the at least one through-hole 4 of the core 3.

The clamp 7 of FIG. 6 can be directly screwed to the nut 13 with no need of using a screw. Furthermore, in order to stop the clamp 7 from unscrewing itself from the nut 13 (due to possible vibrations) a self-locking nut 13 or any other similar device may be used. Preferably, a washer 14 will be placed between the nut 13 and core 3.

Figure 7A:
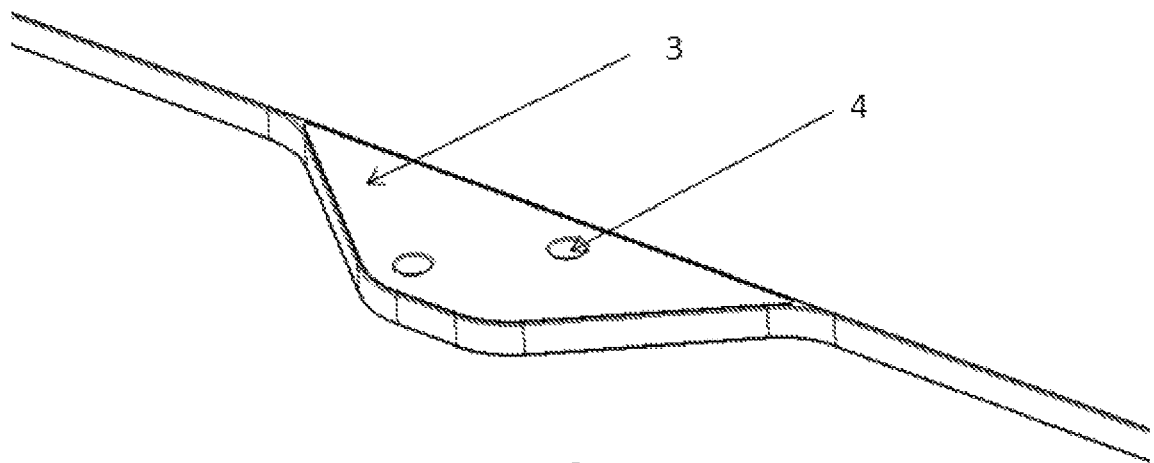
FIGS. 7A and 7B show a detailed view of an attachable system having a core.
Figure 7B:
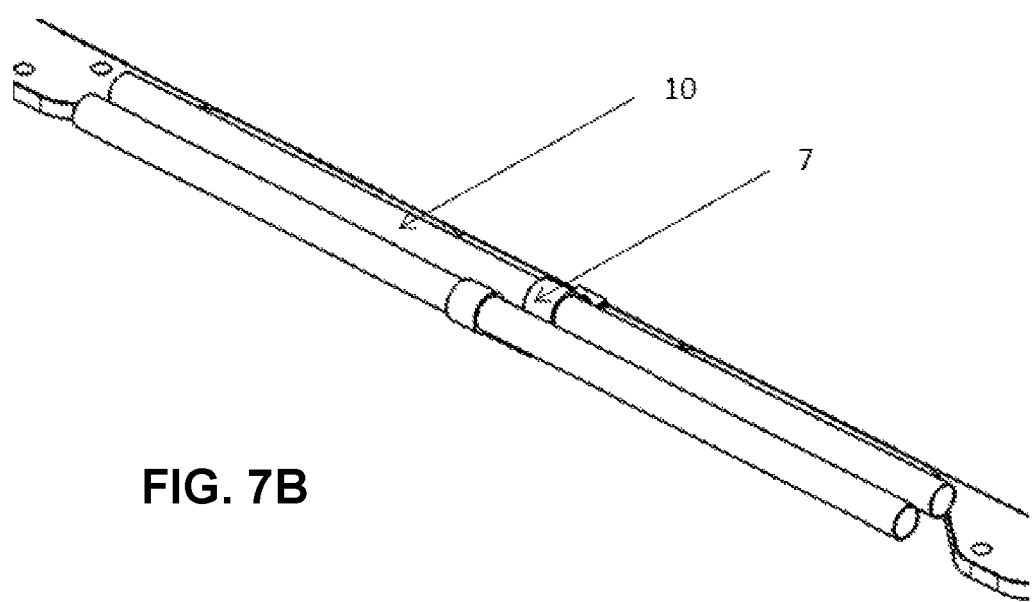

FIGS. 7A and 7B show a detailed view of an attachable system having a core 3 according to another preferred embodiment. As shown in FIG. 7a, the core 3 may have several through-holes 4, misaligned to prevent clamps 7 from colliding when attached to the insert 2. FIG. 7b shows a perspective view of external routing 10 attached to the core 3 shown in FIG. 7a.

Figure 8:
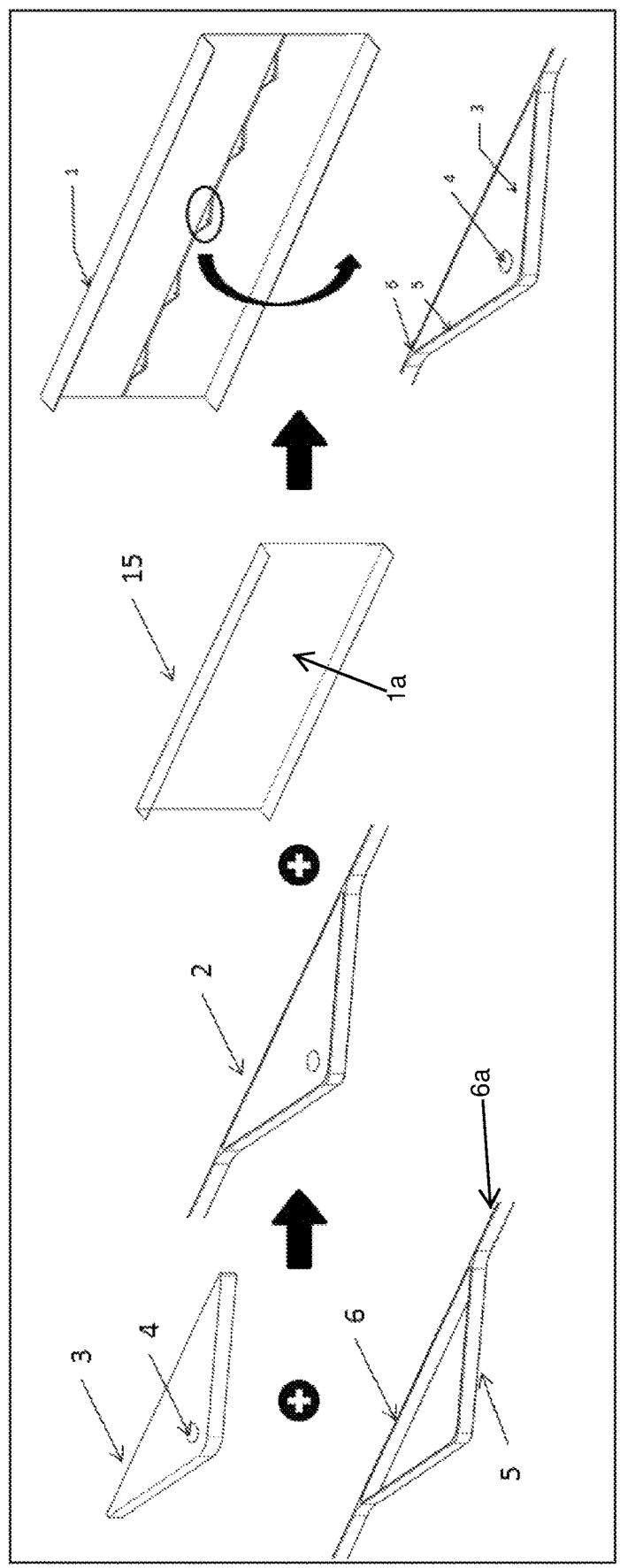
FIG. 8 show different steps of a method for manufacturing a composite structure.

FIG. 8 illustrates a method for manufacturing a composite structure 1 having at least one insert 2 for receiving attachment devices. The method comprises:

(i) providing at least one insert 2 comprising a core 3 having a major dimension and containing at least one through-hole 4, and a composite strip arrangement formed by a first strip section 5 bordering the core 3 and attached to the core 3 by an adhesive polymeric layer on surface of the first strip sections 5 facing the core 3. The second strip section 6 includes a strip portion between the ends of the first section 5 and one or two free strip end 6a that extend beyond the first section 5. The adhesive polymeric layer at the ends of the first strip section 5 overlaps the second strip section 6 and adheres to the second strip section 6. The core 3 is inserted in an interior area bounded by the first and second strip sections 5, 6. The adhesive polymeric layer secures the core to the first and second strip sections 5, 6.

(ii) placing at least one part of both the first 5 and the second portion 6 of the composite strip arrangement over a first surface 1a of the composite structure 1, such that the major dimension of the core 3 is positioned substantially transversal to said first surface 1a of the composite structure 1. An exposed surface of the first and/or second strip sections 5, 6 may be placed against the surface 1a of the plain composite structure 15.

(iii) curing the at least one insert 2 and the composite structure 15 together to obtain a single piece composite structure 1 with an integrated insert 2 for receiving attachment devices.

FIG. 8 shows different steps of the method. The steps (from left to right in FIG. 8) include providing at least one core 3 having a major dimension and containing at least one through-hole 4, and at least one composite strip arrangement formed by at least one first section 5, and a second section 6 comprising at least one free end 6a for attachment to a plain composite structure 15.

The next step is providing an insert 2 including the core 3 and the first strip section 5 surrounding the core 3 attached to the core 3 by an adhesive polymeric layer, the section strip section 6, and the plain composite structure 15 to which the insert 2 is going to be co-cured.

The composite structure 1 is formed by curing the insert 2 and the plain composite structure 15. The resulting composite structure may include several inserts 2 and the composite strips 5, 6, may extend along the entire length of the structure 1.

The method may further include fixing a clamp 7 to the insert 2 via the at least one through-hole 4 of the core 3) to thus allow attaching external routing 10 to the insert 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A composite structure for an aircraft comprising:
a first surface of the composite structure;
at least one insert configured to receive attachment devices, wherein the at least one insert includes:
a core having a major dimension and including at least one through-hole, and
a composite strip arrangement formed by a first section adjacent the core and attached to the core by an adhesive polymeric layer, and a second section adjacent the core and attached to the first section, wherein the second section includes at least one free end;
wherein at least one part of both the first section and the second section of the composite strip arrangement is disposed on a first surface of the composite structure, and the major dimension of the core is positioned substantially transverse to the first surface of the composite structure;
wherein the at least one insert is co-cured with the composite structure form a single piece of the composite structure and the insert, and
wherein the at least one insert is configured to receive at least one attachment device.

2. The composite structure according to claim 1, wherein the composite structure has opposite edges, and wherein the second section extends between the opposite edges and is configured to provide support for attachment devices to be attached to the at least one insert.

3. The composite structure according to claim 1, wherein the core is formed by foam polymer or short-fiber thermoplastic polymer.

4. The composite structure according to claim 1, wherein the core has a polygonal shape.

5. The composite structure according to claim 1, wherein the at least one through-hole in the core is positioned at an outermost section of the core and away from the second section.

6. The composite structure according to claim 1, wherein the insert includes a metal bush received in the through-hole of the core, wherein the metal brush formed of an aluminum alloy, titanium or a steel alloy.

7. An attachable system for an aircraft comprising:
a composite structure including a first surface;
an insert including a composite core plate with a through hole and composite strip sections adjacent edges of the composite core plate, wherein the composite strip sections adhere to the core pate, wherein an exposed surface of at least one of the composite strip sections abuts and is secured to the first surface of the composite structure; and
an attachment device including a clamp and the attachment device fixed to the insert by a fastener in the through hole;
wherein a long edge of the core plate is adjacent the first surface such that one of the composite strip sections is sandwiched between the long edge and the first surface;
wherein a free end of at least one of the composite strip sections extends beyond the core plate and is secured to the first surface.

8. The attachable system according to claim 7, wherein the attachment device includes a bracket configured to support the clamp, wherein the bracket is partially disposed on the insert and fixed to the insert by the fastener.

9. The attachable system according to claim 8, wherein the bracket and the clamp are a single body component.

10. The attachable system according to claim 8, wherein the fastener includes a spacer which elevates the clamp above the insert.

11. The attachable system according to claim 7, wherein the attachment device further comprises a tubular spacer disposed between the clamp and the through-hole of the core.

12. The attachable system according to claim 7, wherein the clamp has an annular body and opposing projections, wherein one of the opposing projections has an aperture to receive the fastener, and the other of the opposing projections ends at a tubular spacer on the fastener, wherein the spacer has a threaded end to fix the clamp to the insert.

13. The attachable system according to claim 7, wherein the clamp is one of a saddle clamp, a P-clamp, and a double P clamp.

14. A method to manufacture a composite structure comprising:
forming providing an insert by applying an adhesive layer on a first composite strip to an outer edge of a core plate having a through hole, wherein a long edge of the core plate is not covered by the first composite strip;
applying the long edge of the core plate to a first side of a second composite strip and applying a portion of the first composite strip to a portion of the second composite strip beyond the core plate, wherein the first and second composite strips entirely cover peripheral edges of the core plate;
attaching a second side of the second composite strip to a first surface of the composite structure, such that the second composite strip is sandwiched between the first surface and the long edge of the core plate and portions of the second side of the second composite strip beyond the core plate extend are attached to the first surface; and
curing the insert and the composite structure together such that the insert with the core plate and first and second composite strips and the composite structure form a single piece composite structure.

15. The method according to claim 14, further comprising, after the curing, fixing a clamp to the insert by a fastener engaging the clamp and the at least one through-hole of the core plate.

* * * * *